United States Patent
VanWiggeren et al.

(10) Patent No.: US 7,492,351 B2
(45) Date of Patent: Feb. 17, 2009

(54) OPTICAL NAVIGATION BASED ON LASER FEEDBACK OR LASER INTERFEROMETRY

(75) Inventors: Gregory D. VanWiggeren, San Jose, CA (US); Douglas M. Baney, Los Altos, CA (US); Gary B. Gordon, Saratoga, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 635 days.

(21) Appl. No.: 10/741,952

(22) Filed: Dec. 18, 2003

(65) Prior Publication Data

US 2005/0134556 A1 Jun. 23, 2005

(51) Int. Cl.
*G06F 3/033* (2006.01)

(52) U.S. Cl. ............... 345/157; 345/156; 345/163; 345/166; 356/28.5; 356/450

(58) Field of Classification Search ......... 345/156, 345/157, 163, 166; 356/28, 28.5, 450, 484, 356/486

See application file for complete search history.

(56) References Cited

U.S. PATENT DOCUMENTS

| | | | |
|---|---|---|---|
| 5,838,439 A * | 11/1998 | Zang et al. | ........... 356/484 |
| 6,246,482 B1 | 6/2001 | Kinrot et al. | |
| 6,330,057 B1 | 12/2001 | Lederer et al. | |
| 6,424,407 B1 | 7/2002 | Kinrot et al. | |
| 6,452,683 B1 | 9/2002 | Kinrot et al. | |
| 2003/0142288 A1 | 7/2003 | Kinrot et al. | |
| 2005/0243053 A1 * | 11/2005 | Liess et al. | ........... 345/156 |

FOREIGN PATENT DOCUMENTS

WO  WO 99/46603  9/1999

OTHER PUBLICATIONS

"Philips CFT develops revolutionary laser-based scrolling device Introducing the Laser Scrolling device", Philips Centre for Industrial Technology, paper downloaded on Oct. 29, 2003 from http://www.cft.philips.com/americas/html/pressCenter/index6.htm. pp. 1-3.

(Continued)

*Primary Examiner*—Sumati Lefkowitz
*Assistant Examiner*—Seokyun Moon

(57) ABSTRACT

A computer cursor control device includes (1) a light source generating light directed toward a stationary surface, (2) an optional phase modulator, (3) an optional function generator causing the phase modulator to periodically phase shift the light, and (4) a signal processor determining a direction in which the device is moving from a beat frequency or an asymmetry in the light intensity. Another computer cursor control device includes (1) an optical element combining reference and measurement beams to form a heterodyned beam, (2) a phase modulator located in an optical path of the reference beam or the measurement beam, (3) a function generator causing the phase modulator to phase shift the reference beam, and (4) a signal processor determining a direction in which the device is moving from a beat frequency of the heterodyned beam.

34 Claims, 7 Drawing Sheets

OTHER PUBLICATIONS

Opher Kinrot et al., "Interferometry: Encoder measures motion through interferometry", Laser Focus World, paper downloaded on Oct. 29, 2003 from http://laserfocusworld.printthis.clickability.com/pt/cpt?action=cpt&expire=&urlID=8100... , pp. 1-4.

Edson T. Shimizu, "Directional discrimination in the self-mixing type laser Doppler velocimeter", Applied Optics, Nov. 1, 1987, vol. 26, No. 21, pp. 4541-4544.

P. A. Porta et al., "Laser Dopler Velocimetry by Optical Self-Mixing in Vertical-Cavity Surface-Emitting Lasers", IEEE Photonics Technology Letters, vol. 14, No. 12, Dec. 2002, pp. 1719-1721.

H. W. Jentink et al. "Small laser Doppler velocimeter based on the sefl-mixing effect in a diode laser", Applied Optics, Jan. 15, 1988/vol. 27, No. 2, pp. 379-385.

Thierry Bosch et al., "Optical feedback interferometry for sensing application", Society of Photo-Optical Instrumentation Engineers, vol. 40, No. 1, Jan. 2001, pp. 20-27.

Silvano Donati et al., "Laser Diode Feedback Interferometer for Measurement of Displacements without Ambiguity", IEEE Journal of Quantum Electronics, vol. 31, No. 1, Jan. 1995, pp. 113-119.

P. A. Roos et al., "Laser vibrometer based on optical-feedback-induced frequency modulation of a single-mode laser diode", Applied Optics, vol. 35, No. 34, Dec. 1, 1996, pp. 6754-6761.

* cited by examiner

OPTICAL NAVIGATION BASED ON LASER FEEDBACK OR LASER INTERFEROMETRY

DESCRIPTION OF RELATED ART

A typical optical mouse uses a light-emitting diode (LED) to bounce light off a surface onto a complimentary metal-oxide semiconductor (CMOS) sensor. The CMOS sensor captures images of the surface and sends them to a digital signal processor (DSP) for analysis. The DSP detects pattern changes over a sequence of images to determine how far the mouse has moved and sends the corresponding coordinates to the computer. The CMOS sensor and the DSP are typically implemented in a single integrated circuit (IC) chip. One drawback of the optical mouse is the power consumed by the IC chip, especially when the optical mouse is cordless and powered by batteries.

SUMMARY

In one embodiment of the invention, a cursor control device for a computer includes (1) a light source generating light being directed toward a stationary surface, wherein a portion of the light reflects back into the light source and causes an intensity fluctuation of the light, (2) a phase modulator, (3) a function generator causing the phase modulator to phase shift the light, and (4) a signal processor determining a direction in which the device is moving from a beat frequency of the light.

In another embodiment of the invention, a cursor control device for a computer includes (1) a light source generating light directed toward a stationary surface, wherein a portion of the light reflects back into the light source and causes an intensity fluctuation of the light and (2) a signal processor determining a direction in which the device is moving from an asymmetry in the intensity fluctuation.

In another embodiment of the invention, a cursor control device for a computer includes (1) an optical element combining reference and measurement beams to form a heterodyned beam, (2) a phase modulator located in an optical path of the reference beam or the measurement beam, (3) a function generator causing the phase modulator to phase shift the reference beam or the measurement beam, and (4) a signal processor determining a direction in which the device is moving from a beat frequency of the heterodyned beam.

DETAILED DESCRIPTION

Figure 1:
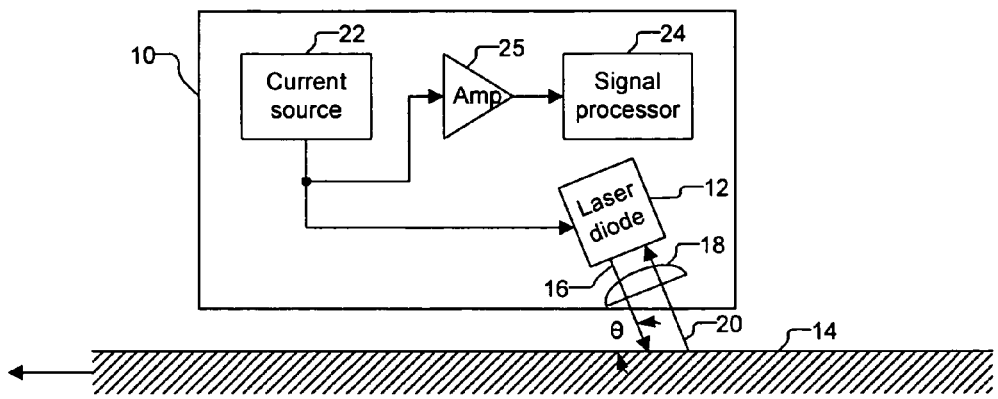
FIG. 1 is a block diagram of a conventional laser Doppler velocimeter.

FIG. 1 illustrates a conventional laser Doppler velocimeter (LDV) 10 that uses the optical self-mixing property of a semiconductor laser diode 12 to detect the velocity of a moving surface 14. Semiconductor laser diode 12 emits light 16 focused by a lens 18 onto moving surface 14. Moving surface 14 scatters a portion of light 16, shown as backscattered light 20, back into the laser cavity at a Doppler shifted frequency. The interference between light 16 inside the laser cavity and backscattered light 20 results in a fluctuation of the light intensity with a beat frequency that is equal to the differences of the two light frequencies. The difference is provided by the following formula:

$$\Delta v = \frac{2v\cos\theta}{\lambda}, \qquad (1)$$

where $\Delta v$ is the frequency difference between light 16 and backscattered light 20, $v$ is the speed of moving surface 14, $\theta$ is the angle of the laser beam direction relative to the velocity of the stationary surface 14, and $\lambda$ is the wavelength of the laser light.

When using a constant current source 22 to power semiconductor laser diode 12, the fluctuation of the voltage across the junction of semiconductor laser diode 12 correlates with the fluctuation of the light intensity. Thus, a signal processor 24 is coupled to the power line of constant current source 22 to determine the speed of moving surface 14 from the frequency spectrum of the voltage fluctuation. An amplifier 25 can be optionally coupled between signal processor 24 and constant current source 22.

Figure 2A:
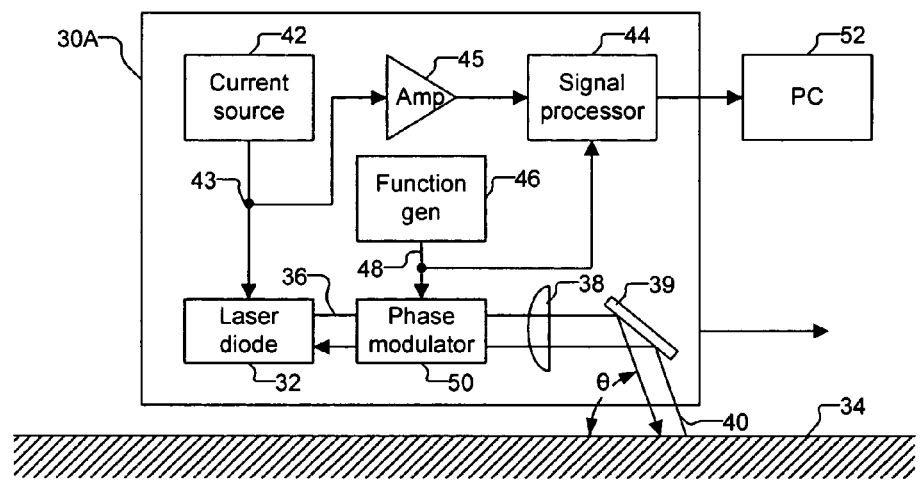
FIGS. 2A, 2B, 3A, 3B, 4A, 4B, 6A, 6B, and 8 are block diagrams of cursor control devices for a computer in embodiments of the invention.

FIG. 2A illustrates a cursor control device 30A that uses the optical self-mixing property of a light source 32, such as a semiconductor laser diode, to detect the movement of device 30A relative to a stationary surface 34 in one embodiment of the invention. Cursor control device 30A can be an optical navigation device such as an optical mouse or an optical pen. Semiconductor laser diode 32 emits light 36 onto stationary surface 34. In one embodiment, a lens 38 directs light 36 and a mirror 39 reflects light 36 onto stationary surface 34. Stationary surface 34 scatters a portion of light 36, shown as backscattered light 40, back into the laser cavity at a Doppler shifted frequency. For clarity, lights 36 and 40 are shown to be offset although in actuality they would be on the same or similar paths. When phase modulator 50 is not used, the interference between light 36 inside the laser cavity and backscattered light 40 results in a fluctuation of the light intensity with a beat frequency that is equal to the difference of the two light frequencies.

A constant current source 42 provides a constant current to semiconductor laser diode 32. The fluctuating light intensity caused by motion of the cursor control device 30A results in a fluctuation of the voltage or current at node 43. This fluctuation is coupled to a signal processor 44 by an amplifier 45. In one embodiment, amplifier 45 can be incorporated into signal processor 44. When phase modulator 50 is not used, signal processor 44 determines the speed of optical navigation cursor control device 30A relative to stationary surface 34 using equation 1 described above, where $\Delta v$ is the frequency difference between light 36 and backscattered light 40, $v$ is the speed of the cursor control device, and $\theta$ is the angle of the laser beam direction relative to the velocity of the cursor control device.

This method for determining the speed of the device does not enable determination of the direction of the device's movement. This is because the measured frequency of the intensity fluctuation provides only the absolute value of the difference in frequency between light 36 and backscattered light 40 (absent any phase modulation introduced by phase modulator 50 described later). In other words, it is not known if backscattered light 40 was upshifted or downshifted in frequency with respect to the frequency of light 36 so the direction in which the cursor control device is moving is not known.

To determine the direction in which the cursor control device is moving, cursor control device 30A further includes a function generator 46 that provides a control signal 48 to signal processor 44 and phase modulator 50 placed in the optical path of light 36. In one embodiment, function generator 46 generates a serrodyne (saw tooth) or a sinusoidal control signal 48 that causes phase modulator 50 to shift the phase of light 36. The phase modulation of the light creates a beat frequency that can be detected at node 43 even when the cursor control device 30A is not moving. Once cursor control device 30A is moving, the beat frequency changes. The beat frequency would increase if cursor control device 30A is moving in one direction. Conversely, the beat frequency would decrease if cursor control device 30A is moving in another direction. Signal processor 44 observes the change in the beat frequency of the light in response to the movement of cursor control device 30A to determine the direction in which the cursor control device is moving.

In one embodiment using a serrodyne control signal, phase modulator 50 periodically increases the optical path of light 36 and then resets it to the original length. Thus, cursor control device 30A is moving in a first direction (e.g., to the right) when the intensity fluctuation frequency is increased as the optical path of light 36 is increasing. Conversely, cursor control device 30A is moving in a second direction (e.g., to the left) when the intensity fluctuation frequency is decreased as the optical path of light 36 is increasing.

Alternatively, if phase modulator 50 acts to periodically decrease the optical path of light 36 and then resetting to the original optical path length, cursor control device 30A is moving in the first direction (e.g., to the right) when the intensity fluctuation frequency is decreased as the optical path of light 36 is decreasing. Conversely, cursor control device 30A is moving in the second direction (e.g., to the left) when the intensity fluctuation frequency is increased while the optical path of light 36 is decreasing.

Signal processor 44 transmits the speed and its direction to a computer 52 either through a cable or a wireless connection. From the velocity and the duration of the movement, computer 52 can determine the motion of the cursor control device, including the distance and direction in which it travels.

Figure 2B:
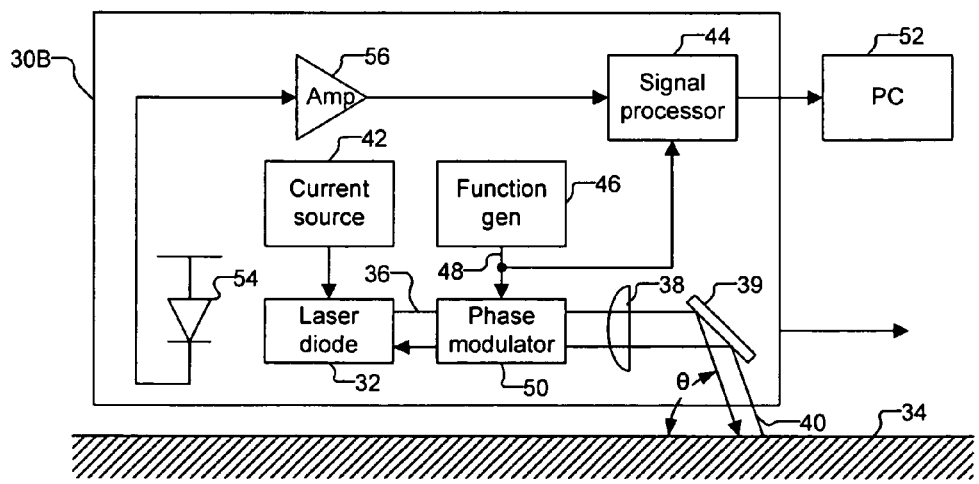

FIG. 2B illustrates a cursor control device 30B in one embodiment of the invention. Cursor control device 30B is similar to cursor control device 30A (FIG. 2A) but does not detect the intensity fluctuation through the voltage fluctuation of the laser junction of semiconductor laser diode 32. Instead, cursor control device 30B uses a photo detector 54, such as a photodiode, to detect the intensity fluctuation. Photo detector 54 can be placed at any location where the intensity fluctuation of laser diode 32 can be detected. Signal processor 44 is coupled through a transimpedance amplifier 56 to detect the current fluctuation of photodiode 54, which corresponds to the intensity fluctuation of semiconductor laser diode 32.

Figure 3A:
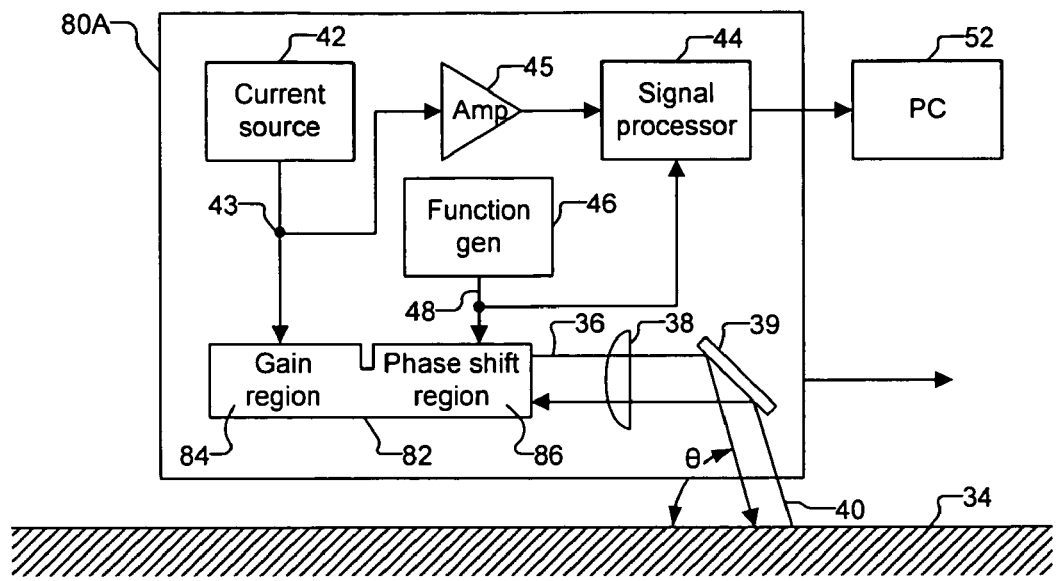

FIG. 3A illustrates a cursor control device 80A in one embodiment of the invention. Cursor control device 80A is similar to cursor control device 30A (FIG. 2A) but uses a multi-section semiconductor laser 82 instead of discrete semiconductor laser diode 32 (FIG. 2A) and phase modulator 50 (FIG. 2A). This laser may be realized in the typical buried heterostructure design, or in a vertical cavity arrangement. Laser 82 includes a gain region 84 that emits light 36, and a phase shift region 86 that phase shifts light 36. In one embodiment, phase shift region 86 is within the laser cavity but outside gain region 84. Current source 42 is coupled to gain region 84 to supply power signal 43 while function generator 46 is coupled to phase shift region 86 to supply control signal 48.

Figure 3B:
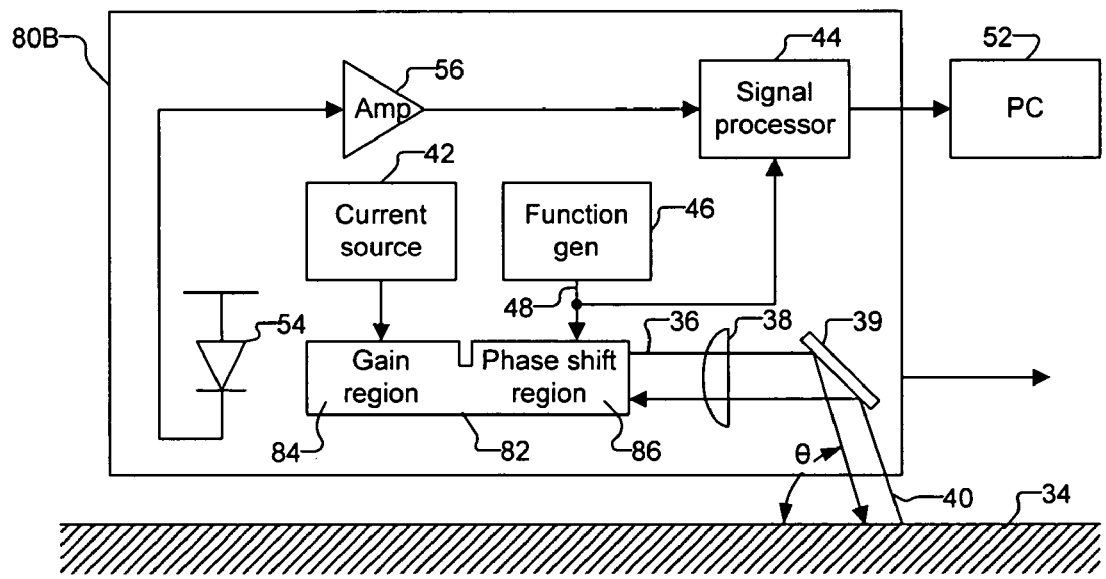

FIG. 3B illustrates a cursor control device 80B in one embodiment of the invention. Cursor control device 80B is similar to cursor control device 80A (FIG. 3A) but does not detect the intensity fluctuation through the voltage fluctuation of the laser junction of multi-section semiconductor laser 82. Instead, cursor control device 80B uses photodiode 54 to detect the intensity fluctuation. Signal processor 44 is coupled through transimpedance amplifier 56 to detect the current fluctuation of photodiode 54, which corresponds to the intensity fluctuation of multi-section semiconductor laser 82.

Figure 4A:
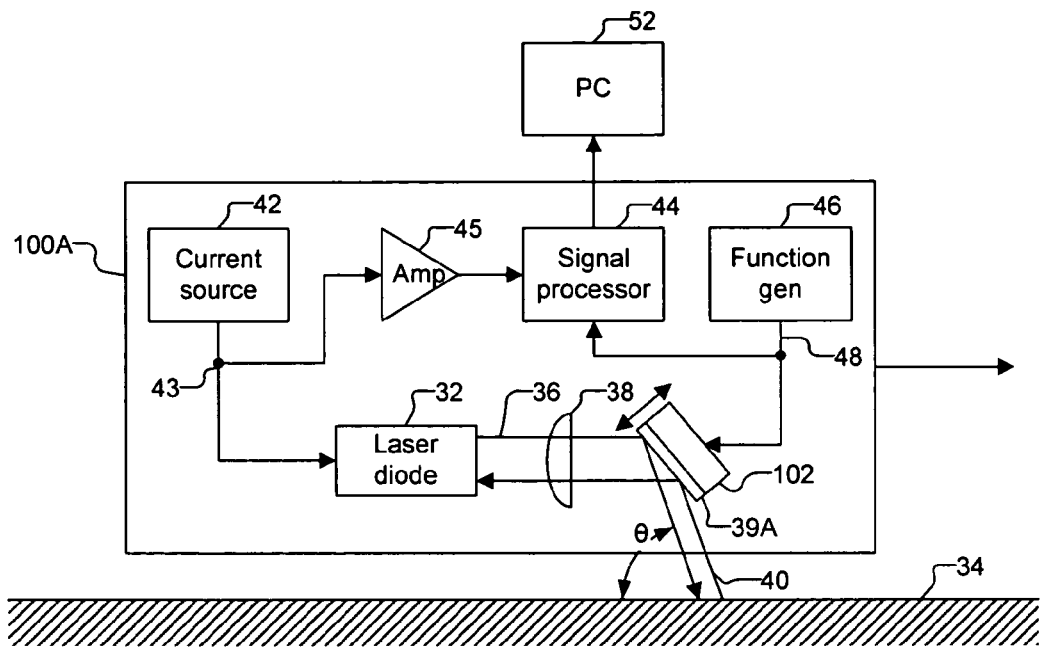

FIG. 4A illustrates a cursor control device 100A in one embodiment of the invention. Cursor control 100A is similar to cursor control device 30A (FIG. 2A) but uses a movable mirror 39A that substitutes for both phase modulator 50 (FIG. 2A) and mirror 39 (FIG. 2A). In one embodiment, movable mirror 39A is attached to an actuator 102, such as a piezo-electric (PZT) or a micro-electromechanical system (MEMS) actuator, that moves mirror 39A to increase or decrease the optical path of light 36. Function generator 46 is coupled to actuator 102 to supply control signal 48.

Figure 4B:
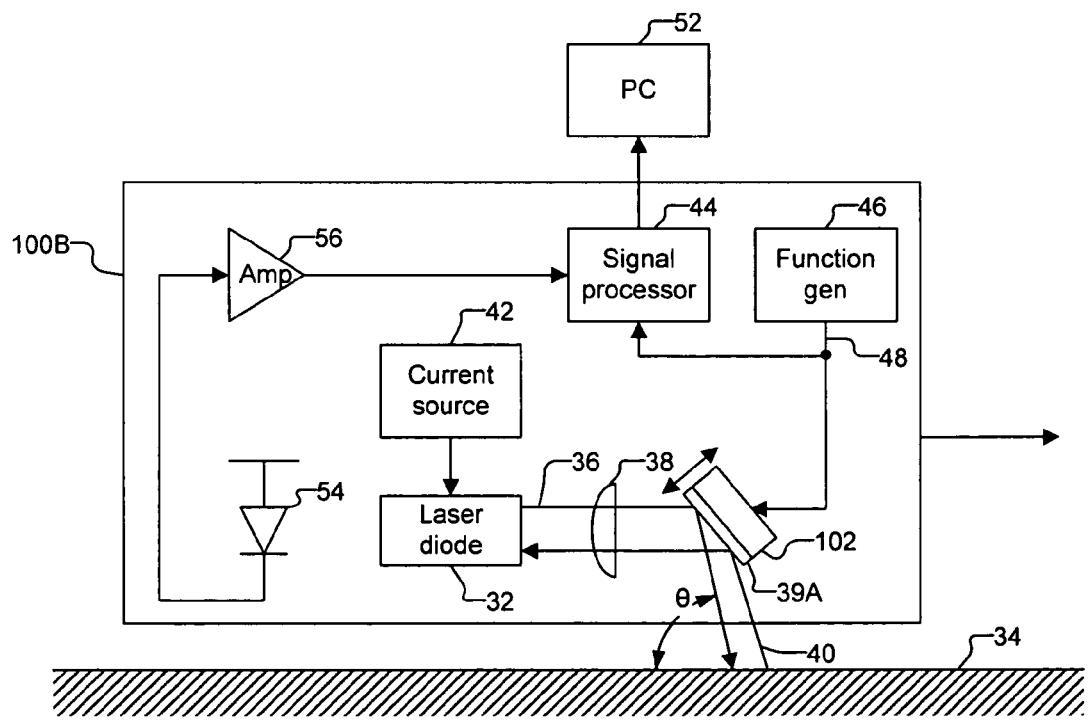

FIG. 4B illustrates a cursor control device 100B in one embodiment of the invention. Cursor control device 100B is similar to cursor control device 100A (FIG. 4A) but does not detect the intensity fluctuation through the voltage fluctuation of semiconductor laser diode 82. Instead, cursor control device 100B uses photodiode 54 to detect the intensity fluctuation. Signal processor 44 is coupled through transimpedance amplifier 56 to detect the current fluctuation of photodiode 54, which corresponds to the intensity fluctuation of semiconductor laser diode 32.

Figure 5:
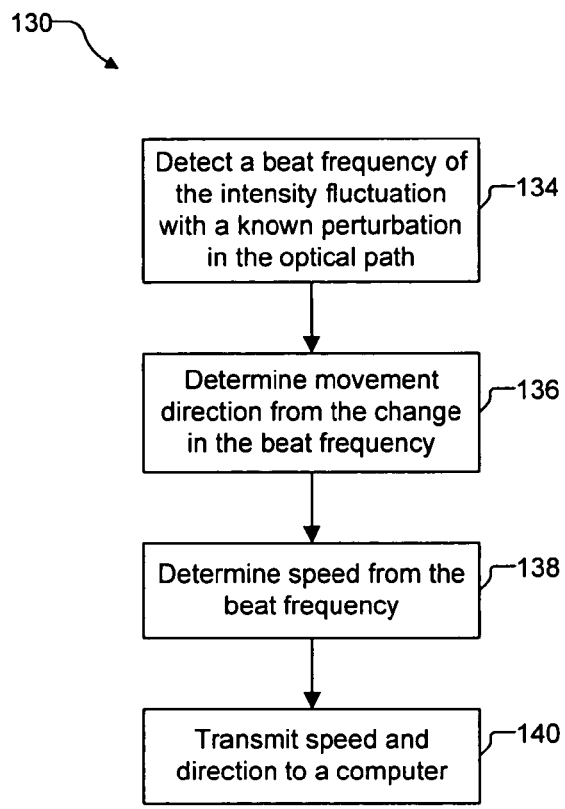
FIGS. 5 and 7 are flowcharts of methods to determine the displacement direction of a cursor control device in embodiments of the invention.

FIG. 5 illustrates a method 130 to operate the cursor control devices described in FIGS. 2A, 2B, 3A, 3B, 4A, and 4B to determine their speed and direction in one embodiment of the invention.

In step 134, signal processor 44 detects a beat frequency of the intensity fluctuation of the light source with the phase of the laser light subjected to a known perturbation while the cursor control device is moving.

As described above, when the cursor control device is stationary, the known perturbation (e.g., phase modulation) creates a beat frequency. Once the cursor control device is moving, the beat frequency changes. The change in the beat frequency is observed to determine the direction in which the cursor control device is moving. Depending on the embodiments described above, the phase modulation could be caused by a phase modulator, a phase shift region of a multi-section semiconductor laser, or a movable mirror. The known perturbation could be increasing or decreasing the optical path of the laser light.

In step 136, signal processor 44 determines the direction in which the cursor control device is moving from the known perturbation and the change in the beat frequency of the intensity fluctuation.

As described above, the cursor control device is moving in a first direction (e.g., to the right) when the beat frequency is increased as the optical path of the light is increasing. Conversely, the cursor control device is moving in a second direction (e.g., to the left) when the beat frequency is decreased as the optical path of the light is increasing.

In another embodiment, the cursor control device is moving in a first direction (e.g., to the right) when the beat frequency is decreased as the optical path of the light is decreasing. Conversely, the cursor control device is moving in a second direction (e.g., to the left) when the beat frequency is increased as the optical path of the light is decreasing.

In step 138, signal processor 44 determines the speed of the cursor control device from the beat frequency of the intensity fluctuation. To do so, signal processor 44 must factor out the frequency components caused by the known perturbation in the light path (e.g., phase modulator 50, phase shift region 86, or movable mirror 39A). The speed of the cursor control device is determined as follows:

$$v = \frac{(f_{det} - f(V(t)))\lambda}{2\cos\theta}, \qquad (2)$$

where $f_{det}$ is the detected beat frequency and where $f(V(t))$ is the frequency component caused by the perturbation in the light path (e.g., phase modulation) that can be observed when the cursor control device is stationary. $V(t)$ is the voltage function over time that causes the perturbation in the light path (e.g., a serrodyne voltage signal).

In step 140, signal processor 44 transmits the speed and the direction to the computer. The computer then uses the speed and the direction to determine how to move a cursor on the computer screen. Signal processor 44 measures the speed of the cursor control device many times each second (e.g., more than 100 times each second). Thus, the computer can determine the distance traveled by the cursor control device by multiplying the speed by the time interval in which the speed is measured.

Figure 6A:
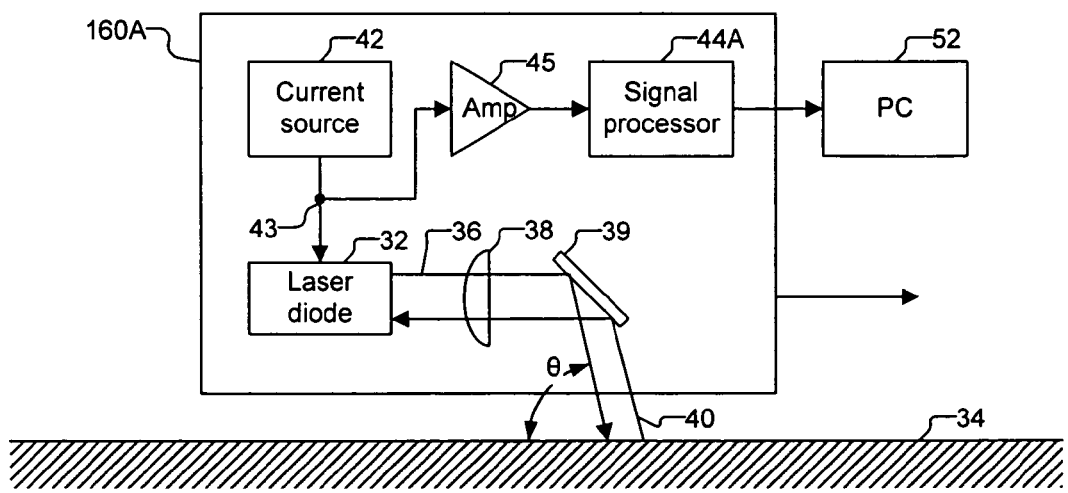

FIG. 6A illustrates a cursor control device 160A in one embodiment of the invention. Cursor control device 160A is similar to cursor control device 30A (FIG. 2A) but does not include function generator 46 (FIG. 2A) and phase modulator 50 (FIG. 2A). Cursor control device 160A includes a signal processor 44A that determines the direction in which the cursor control device is moving from the asymmetry of the intensity fluctuation waveform shown in FIGS. 6C and 6D. Specifically, cursor control device 160A is moving in a first direction (e.g., to the right) when the intensity fluctuation waveform has a negative lean as shown in FIG. 6C. Conversely, cursor control device 160A is moving in a second direction (e.g., to the left) when the intensity fluctuation waveform is reversed and has a positive lean as shown in FIG. 6D.

Figure 6B:
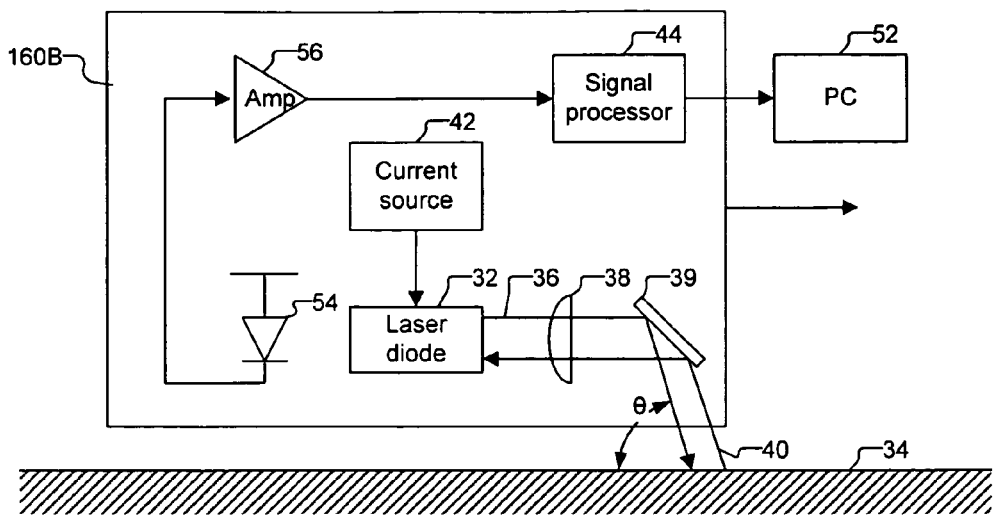
Figure 6C:
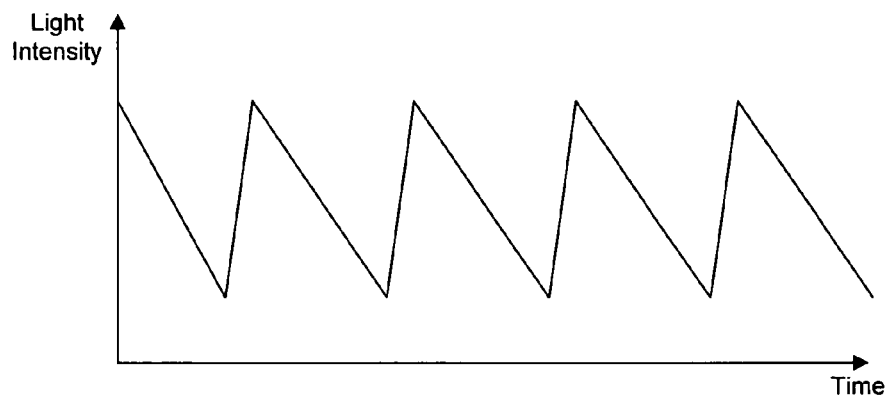
FIGS. 6C and 6D are waveforms of intensity fluctuation used to determine the displacement direction of a cursor control device in one embodiment of the invention.
Figure 6D:
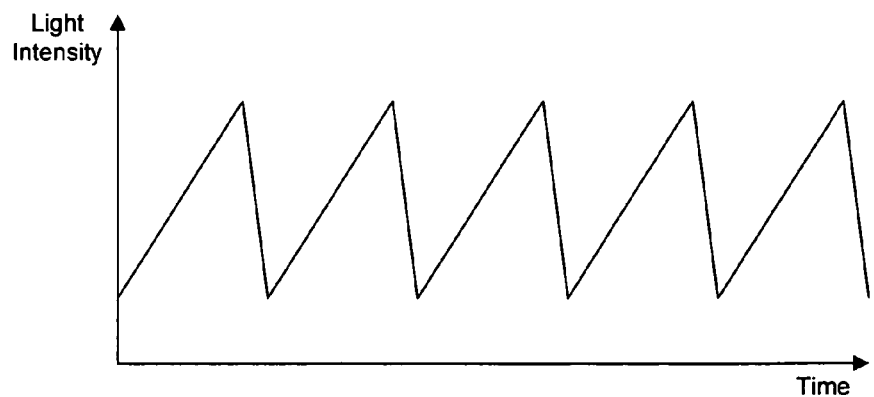

FIG. 6B illustrates a cursor control device 160B in one embodiment of the invention. Cursor control device 160B is similar to cursor control device 160A (FIG. 6A) but does not detect the intensity fluctuation through the voltage fluctuation of semiconductor laser diode 32. Instead, cursor control device 160B uses photodiode 54 to detect the intensity fluctuation. Signal processor 44A is coupled through transimpedance amplifier 56 to detect the current fluctuation of photodiode 54, which corresponds to the intensity fluctuation of semiconductor laser diode 32.

Figure 7:
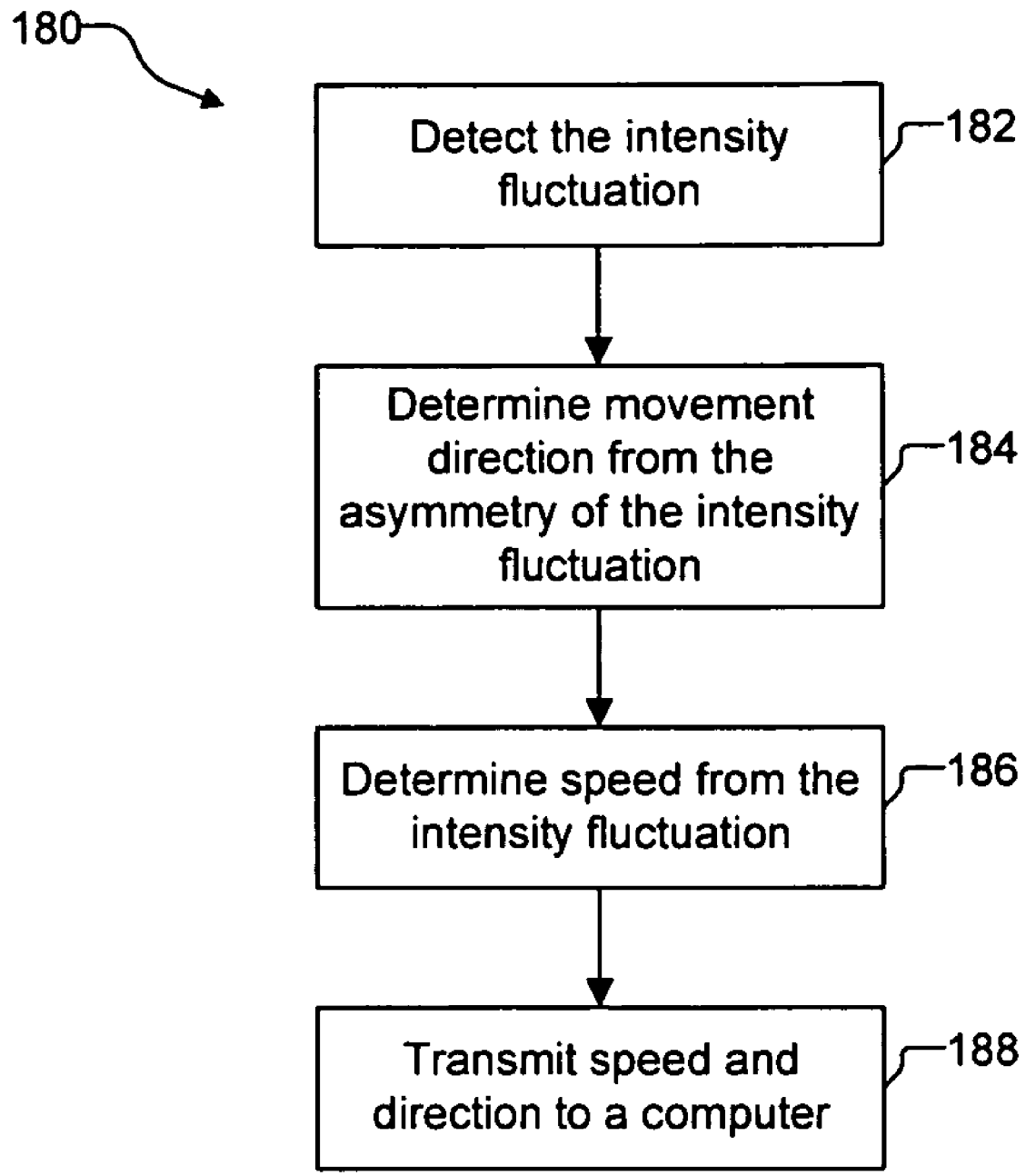

FIG. 7 illustrates a method 180 to operate the cursor control devices described in FIGS. 6A and 6B to determine their speed and direction in one embodiment of the invention.

In step 182, signal processor 44A detects the intensity fluctuation of the light source.

In step 184, signal processor 44A determines the direction in which the cursor control device is moving from the asymmetry, specifically the lean, of the intensity fluctuation waveform. Specifically, the cursor control device is moving in a first direction when the intensity fluctuation has a negative lean as shown in FIG. 6C. Conversely, the cursor control device is moving in a second direction when the intensity fluctuation waveform is reversed and has a positive lean as shown in FIG. 6D.

In step 186, signal processor 44A determines the speed of the cursor control device from the beat frequency of the intensity fluctuation. In one embodiment, step 186 is implemented like step 138 (FIG. 5) described above without considering the effects of any perturbation in the light path.

In step 188, signal processor 44A transmits the speed and the direction to the computer. The computer then uses the speed and the direction to determine how to move a cursor on the computer screen.

The cursor control devices described above consume less power than typical optical mice because they do not require CMOS sensors and their associated ICs. The cursor control devices described in FIGS. 2A, 3A, 4A, and 6A also require little alignment of the optical components because the laser diode acts both as a light source and as a detector for a single beam. This allows for more efficient production of the cursor control devices because the manufacturing tolerances can be more lenient. The cursor control devices described in FIGS. 2B, 3B, 4B, and 6B also require little alignment of the optical components as long as the photodiode is properly located to detect the intensity fluctuation of the laser diode.

Figure 8:
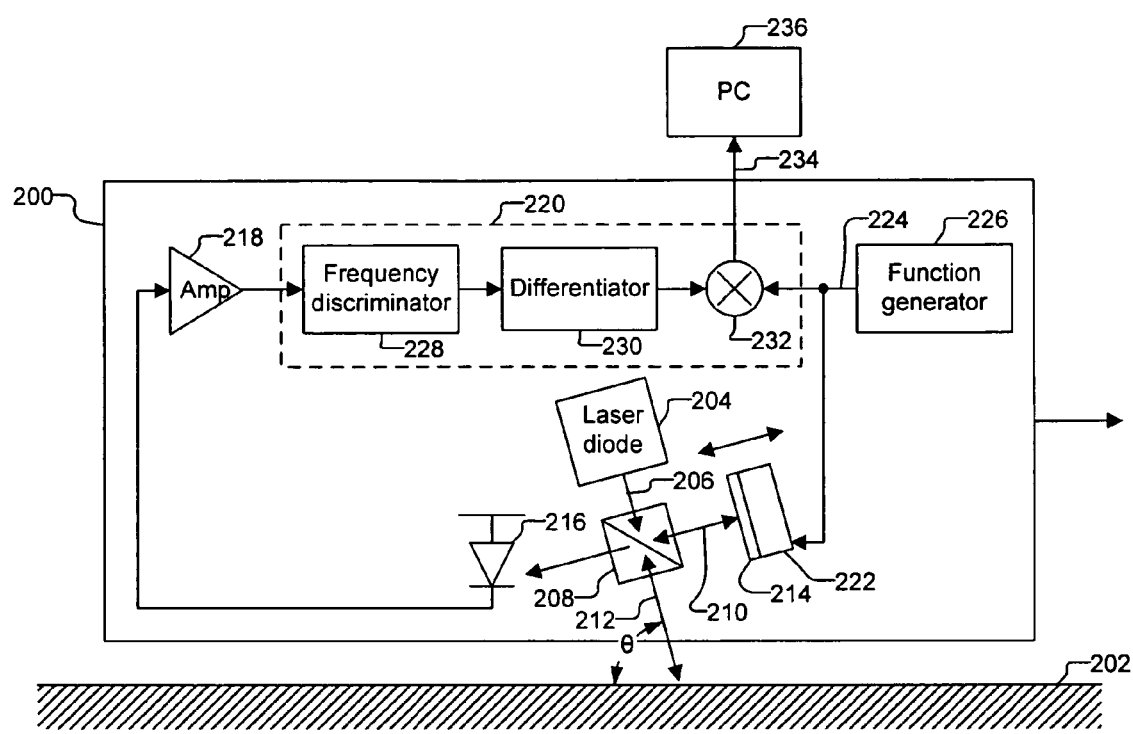

FIG. 8 illustrates a cursor control device 200, such as an optical navigation device, that uses laser interferometry to detect the movement of cursor control device 200 relative to a stationary surface 202 in one embodiment of the invention. A semiconductor laser diode 204 emits light 206 onto a beam-splitter 208, which divides light 206 into a reference beam 210 and a measurement beam 212. Reference beam 210 and measurement beam 212 are reflected back along the same path by a movable mirror 214 and stationary surface 202, respectively. Beam-splitter 208 then recombines the two beams and directs the heterodyned beam onto a photodetector 216, such as a photodiode. A transimpedance amplifier 218 then converts the current signal of photodiode 216 into a voltage signal that corresponds to the signal of the heterodyned beam. The Doppler effect causes a frequency change of the light reflected from stationary surface 202 when cursor control device 200 is moving. Consequently, the heterodyne beam detected by photodiode 216 oscillates in time at a frequency indicative of the speed of the cursor control device 200. This oscillating signal is received by a signal processor 220.

To determine the direction in which the cursor control device is moving, moving mirror 214 is mounted on an actuator 222, such as a PZT or a MEMS actuator, that moves mirror 214 to increase or decrease the optical path of reference light 210. This in turn causes the phase modulation of the light. Actuator 222 is controlled by a control signal 224 generated by a function generator 226. Function generator 226 also provides control signal 224 to signal processor 220. The phase modulation of the light creates a beat frequency that can be detected by photodiode 216 even when cursor control device 200 is not moving. Once cursor control device 200 is moving, the beat frequency changes. The beat frequency would increase if cursor control device 200 is moving in one direction. Conversely, the beat frequency would decrease if cursor control device 200 is moving in another direction. Signal processor 220 observes the change in the beat frequency of the light in response to the movement of cursor control device 200 to determine the direction in which the cursor control device is moving.

Signal processor 220 also determine the speed of the cursor control device 200 from the beat frequency. Signal processor 220 transmits the speed and the direction to a computer 236 through a cable or a wireless connection. Although moving mirror 214 is in the optical path of reference beam 210 in one embodiment, moving mirror 214 can be placed in the optical path of measurement beam 212 in another embodiment to achieve the same result.

Referring back to FIG. 5, method 130 can be modified to operate cursor control device 200 (FIG. 8) in one embodiment of the invention.

In step 134, signal processor 220 detects a beat frequency with the optical path of reference beam 210 subjected to a known perturbation. The known perturbation could be increasing or decreasing the optical path and the phase of reference beam 210 or measurement beam 212.

In step 136, signal processor 220 determines the direction in which the cursor control device is moving from the change in the beat frequency in response to the movement of the device.

Specifically, cursor control device 200 is moving in a first direction (e.g., toward the surface) when the beat frequency increases as the optical path of reference beam 210 is increased. Conversely, cursor control device 200 is moving in a second direction (e.g., away from the surface) when the beat frequency decreases as the optical path of reference beam 210 is increased.

In another embodiment, cursor control device 200 is moving in the first direction when the beat frequency decreases as the optical path of reference beam 210 is decreased. Conversely, cursor control device 200 is moving in the second direction when the beat frequency increases as the optical path of reference beam 210 is decreased.

In step 138, signal processor 220 determines the speed of cursor control device 200 from the beat frequency using equation 2 described above.

In step 140, signal processor 220 transmits the speed and the direction to computer 236. The computer then uses the speed and the direction to determine how to move the cursor on the computer screen.

Referring back to FIG. 8, signal processor 220 can be implemented with a frequency discriminator 228, a differentiator 230, and a mixer 232 in one embodiment of the invention. Frequency discriminator 228, such as a bandpass filter, passes the beat signal at the fundamental Doppler frequency. Differentiator 230, such as a capacitor, receives the filtered beat signal and differentiates the result. Mixer 232 combines the differentiated beat signal and control signal 224 to generate an output signal 234 with values indicating the displacement direction of cursor control device 200. For example, cursor control device 200 is moving in a first direction when signal 234 is above a threshold value, and in a second direction when signal 234 is below a threshold value. Signal processor 220 transmits output signal 234 to a computer 236.

Various other adaptations and combinations of features of the embodiments disclosed are within the scope of the invention. For example, the signal processors in the cursor control devices described above can be implemented in analog, digital, or a combination of analog and digital circuitry. The function of the signal processors in the cursor control devices described above can also be implemented by the computer where the devices only transmit the detected beat frequency, whether in analog or digital form, to the computer. Conversely, the signal processor in the cursor control devices can implement additional functions performed by the computer, such as calculating the distance traveled by the device and transmitting the distance to the computer. Although only measurement along one axis is shown, it is understood that the configurations in the cursor control devices described above can be duplicated for measurement along one or more additional axes to provide navigation in two or more dimensions. Numerous embodiments are encompassed by the following claims.

What is claimed is:

1. A method for determining a direction in which a cursor control device is moving, comprising, while the cursor control device is moving:
    generating light using a constant current;
    directing the light toward a stationary surface;
    periodically varying an optical path of the light incident on the stationary surface to cause a phase shift of the light incident on the stationary surface, wherein periodically varying the optical path of the light incident on the stationary surface further comprises:
       periodically increasing the optical path of the light incident on the stationary surface; and
       resetting the optical path of the light to an original length;
    detecting a beat frequency of the intensity fluctuation of the light caused by a portion of the light reflecting back into a source of the light; and
    determining the direction of a movement of the device from the detected beat frequency.

2. The method of claim 1, wherein said determining the direction is performed by in the device.

3. The method of claim 1, wherein said determining the direction comprises:
    determining that the cursor control device is moving in one direction if the beat frequency has increased; and
    determining that the cursor control device is moving in another direction if the beat frequency has decreased.

4. The method of claim 1, further comprising:
    determining a speed of the device from the beat frequency of the intensity fluctuation of the light.

5. The method of claim 4, wherein said determining a speed is performed in the device.

6. The method of claim 1, wherein said detecting a beat frequency comprises detecting fluctuations in a current or a voltage applied to a light source.

7. The method of claim 1, wherein said detecting a beat frequency comprises monitoring the light with a photodiode.

8. The method of claim 1, wherein the laser is a multi-section semiconductor laser comprising a laser cavity with a gain region and a phase shifting region located outside of the gain region, and said causing a phase shift of the light comprises supplying a control signal to the phase shifting region.

9. The method of claim 1, wherein said causing a phase shift of the light comprises moving a mirror to change an optical path of the light.

10. A cursor control device for a computer, comprising:
    a constant current source to generate a constant current;
    a light source to receive the constant current and to generate light, wherein a portion of the light reflects back into the light source from a stationary surface and causes an intensity fluctuation of the light;
    a phase modulator to periodically vary an optical path of the light incident on the stationary surface to cause a periodic phase shift in the light incident on the stationary surface, wherein the phase modulator is further configured to periodically increase the optical path of the light incident on the stationary surface and to reset the optical path of the light to an original length;
    a function generator coupled to the phase modulator to supply a control signal to the phase modulator; and
    a signal processor monitoring the intensity fluctuation of the light and the phase shift of the light, the signal processor determining a direction in which the device is moving from a beat frequency of the intensity fluctuation in response to a movement of the device.

11. The cursor control device of claim 10, wherein the signal processor is coupled to sense a voltage or a current applied to the light source, which fluctuates according to the intensity fluctuation of the light.

12. The cursor control device of claim 10, further comprises a photodiode monitoring the intensity fluctuation of the light, wherein the signal processor is coupled to the photodiode to monitor the intensity fluctuation of the light.

13. The cursor control device of claim 10, wherein the light source comprises a multi-section semiconductor laser having a laser cavity with a gain region and a phase shifting region, the phase shifting region being the phase modulator.

14. The cursor control device of claim 10, wherein the phase modulator comprises a movable mirror.

15. The cursor control device of claim 10, further comprising a lens for directing the light.

16. The cursor control device of claim 10, wherein the signal processor determines a speed of the device from the beat frequency of the intensity fluctuation.

17. The method of claim 1, further comprising determining that the cursor control device is moving in a first direction in response to an increase in the intensity fluctuation of the light as the optical path of the light is increasing.

18. The method of claim 17, further comprising determining that the cursor control device is moving in a second direction in response to a decrease in the intensity fluctuation of the light as the optical path of the light is increasing.

19. A method for determining a direction in which a cursor control device is moving, comprising, while the cursor control device is moving:
   generating light using a constant current;
   directing the light toward a stationary surface;
   periodically varying an optical path of the light incident on the stationary surface to cause a phase shift of the light incident on the stationary surface, wherein periodically varying the optical path of the light incident on the stationary surface farther comprises:
      periodically decreasing the optical path of the light incident on the stationary surface; and
      resetting the optical path of the light to an original length;
   detecting a beat frequency of the intensity fluctuation of the light caused by a portion of the light reflecting back into a source of the light; and
   determining the direction of a movement of the device from the detected beat frequency.

20. The method of claim 18, further comprising determining that the cursor control device is moving in a first direction in response to a decrease in the intensity fluctuation of the light as the optical path of the light is decreasing.

21. The method of claim 20, further comprising determining that the cursor control device is moving in a second direction in response to an increase in the intensity fluctuation of the light as the optical path of the light is decreasing.

22. The cursor control device of claim 10, wherein the signal processor is configured to determine that the cursor control device is moving in a first direction in response to an increase in the intensity fluctuation of the light as the optical path of the light is increasing.

23. The cursor control device of claim 22, wherein the signal processor is configured to determine that the cursor control device is moving in a second direction in response to a decrease in the intensity fluctuation of the light as the optical path of the light is increasing.

24. A cursor control device comprising:
   a constant current source to generate a constant current;
   a light source to receive the constant current and to generate light, wherein a portion of the light reflects back into the light source from a stationary surface and causes an intensity fluctuation of the light;
   a phase modulator to periodically vary an optical path of the light incident on the stationary surface to cause a periodic phase shift in the light incident on the stationary surface, wherein the phase modulator is further configured to periodically decrease the optical path of the light incident on the stationary surface and to reset the optical path of the light to an original length;
   a function generator coupled to the phase modulator to supply a control signal to the phase modulator; and
   a signal processor monitoring the intensity fluctuation of the light and the phase shift of the light, the signal processor determining a direction in which the device is moving from a beat frequency of the intensity fluctuation in response to a movement of the device.

25. The cursor control device of claim 24, wherein the signal processor is configured to determine that the cursor control device is moving in a first direction in response to a decrease in the intensity fluctuation of the light as the optical path of the light is decreasing.

26. The cursor control device of claim 25, wherein the signal processor is configured to determine that the cursor control device is moving in a second direction in response to an increase in the intensity fluctuation of the light as the optical path of the light is decreasing.

27. The method of claim 19, wherein said determining the direction is performed by in the device.

28. The method of claim 19, wherein said determining the direction comprises:
   determining that the cursor control device is moving in one direction if the beat frequency has increased; and
   determining that the cursor control device is moving in another direction if the beat frequency has decreased.

29. The method of claim 19, further comprising:
   determining a speed of the device from the beat frequency of the intensity fluctuation of the light.

30. The method of claim 29, wherein said determining a speed is performed in the device.

31. The method of claim 19, wherein said detecting a beat frequency comprises detecting fluctuations in a current or a voltage applied to a light source.

32. The cursor control device of claim 24, wherein the signal processor is coupled to sense a voltage or a current applied to the light source, which fluctuates according to the intensity fluctuation of the light.

33. The cursor control device of claim 24, further comprising a lens for directing the light.

34. The cursor control device of claim 24, wherein the signal processor determines a speed of the device from the beat frequency of the intensity fluctuation.

* * * * *

UNITED STATES PATENT AND TRADEMARK OFFICE
CERTIFICATE OF CORRECTION

PATENT NO. : 7,492,351 B2
APPLICATION NO. : 10/741952
DATED : February 17, 2009
INVENTOR(S) : Gregory D. Van Wiggeren et al.

It is certified that error appears in the above-identified patent and that said Letters Patent is hereby corrected as shown below:

Column 9, Line 39, Claim 19, delete "farther" and insert --further--.

Column 9, Line 49 (approx.), Claim 20, delete "claim 18," and insert --claim 19,--.

Signed and Sealed this
First Day of March, 2011

David J. Kappos
*Director of the United States Patent and Trademark Office*